(12) United States Patent
Kjaer (10) Patent No.: US 12,495,997 B2
(45) Date of Patent: Dec. 16, 2025

(54) POROUS MEMBRANE SENSOR ELEMENT (71) Applicant: Radiometer Medical ApS, Brønshøj (DK)

(72) Inventor: Thomas Kjaer, Brønshøj (DK)

(73) Assignee: Radiometer Medical ApS, Brønshøj (DK)

( * ) Notice: Subject to any disclaimer, the term of this patent is extended or adjusted under 35 U.S.C. 154(b) by 382 days.

(21) Appl. No.: 17/043,050

(22) PCT Filed: Apr. 8, 2019

(86) PCT No.: PCT/EP2019/058754
§ 371 (c)(1),
(2) Date: Sep. 29, 2020

(87) PCT Pub. No.: WO2019/197308
PCT Pub. Date: Oct. 17, 2019

(65) Prior Publication Data
US 2021/0015409 A1    Jan. 21, 2021

(30) Foreign Application Priority Data

Apr. 12, 2018   (DK) .......................... PA 2018 00154

(51) Int. Cl.
A61B 5/145    (2006.01)
A61B 5/00     (2006.01)
A61B 5/1455   (2006.01)

(52) U.S. Cl.
CPC ........ *A61B 5/14542* (2013.01); *A61B 5/0075* (2013.01); *A61B 5/14546* (2013.01); *A61B 5/1455* (2013.01); *A61B 2562/02* (2013.01)

(58) Field of Classification Search
CPC .............. A61B 5/14542; A61B 5/0075; A61B 5/14546; A61B 5/1455; A61B 2562/02; A61B 5/14532
See application file for complete search history.

(56) References Cited

U.S. PATENT DOCUMENTS 5,408,312 A     4/1995  Pries et al.
5,783,836 A *   7/1998  Liu ........................ G01N 21/77
                                                      250/559.4

(Continued)

FOREIGN PATENT DOCUMENTS

JP    H01-500928    3/1989
JP    H06-505092    6/1994

(Continued)

OTHER PUBLICATIONS

International Search Report for International Application No. PCT/EP2019/058754, Jun. 24, 2019 (four pages).

(Continued)

*Primary Examiner* — Alex M Valvis
*Assistant Examiner* — Jonathan M Haney
(74) *Attorney, Agent, or Firm* — Frost Brown Todd LLP (57) ABSTRACT A sensor element for detecting an analyte in a fluid sample by optical probing comprises a translucent membrane with a front side defining a sensor surface for contacting a fluid sample, and a back side facing away from the front side. The sensor element has a reflective layer at the front side of the translucent membrane. An optical input port and an optical output port are connected to the back side of the translucent membrane. The sensor element further comprises an optical constriction element with a screen element arranged between the input port and the output port. The constriction element further comprises a reflective element arranged at the backside of the translucent membrane and facing towards the reflective layer, thereby defining a probing region, the probing region comprising pores extending from respective openings at the sensor surface into the translucent membrane.

23 Claims, 3 Drawing Sheets (56) References Cited

U.S. PATENT DOCUMENTS

| | | | |
|---|---|---|---|
| 6,122,042 A | 9/2000 | Wunderman et al. | |
| 2006/0173253 A1* | 8/2006 | Ganapathy | A61M 1/95 607/88 |
| 2006/0285115 A1 | 12/2006 | Tomaru | |
| 2008/0063575 A1 | 3/2008 | Rakow et al. | |
| 2009/0131858 A1* | 5/2009 | Fissell | B01D 61/18 210/243 |
| 2010/0054999 A1 | 3/2010 | Uchiyama et al. | |
| 2010/0189600 A1 | 7/2010 | Hulteen et al. | |
| 2011/0257038 A1 | 10/2011 | Thomas et al. | |
| 2015/0293016 A1* | 10/2015 | Perkins | C25D 5/48 356/402 |
| 2016/0151009 A1 | 6/2016 | Rudmann et al. | |
| 2017/0003222 A1 | 1/2017 | Neijzen et al. | |
| 2019/0239788 A1* | 8/2019 | Rudmann | G01N 21/03 |

FOREIGN PATENT DOCUMENTS

| | | |
|---|---|---|
| JP | 2012-115174 A | 6/2012 |
| JP | 2012-513601 A | 6/2012 |
| JP | 2018-533012 A | 11/2018 |
| WO | WO 88/01376 | 2/1988 |
| WO | WO 2017/085180 A1 | 5/2017 |

OTHER PUBLICATIONS

Written Opinion of the International Searching Authority for International Application No. PCT/EP2019/058754 (ten pages).

\* cited by examiner

POROUS MEMBRANE SENSOR ELEMENT

This application is a national stage filing under 35 U.S.C. § 371 of International Application No. PCT/EP2019/058754, filed on Apr. 8, 2019, which claims priority of Danish Patent Application No. PA 2018 00154, filed on Apr. 12, 2018. The contents of these applications are each incorporated herein by reference.

The present invention relates in one aspect to a sensor element for detecting an analyte in a fluid sample by optical probing. According to a further aspect, the invention relates to a sensor assembly comprising a sensor element and a sample chamber, wherein the sensor element is for optically probing a fluid sample in a sample space of the sample chamber. According to a particular aspect of the invention, the sensor element and the sensor assembly are for analyzing body fluids, such as blood, for analytes in at least a fraction of the body fluid. According to a further particular aspect of the invention, the sensor element and the sensor assembly are for analyzing a sample of a complex fluid comprising both a continuous phase and a discontinuous phase for analytes in the continuous phase of the fluid. According to a yet further aspect a method of detecting an analyte in a fluid sample by optical probing is provided.

BACKGROUND OF THE INVENTION

Detecting an analyte in a complex fluid containing continuous and discontinuous fractions is a challenging, but frequently encountered, measurement problem. Typically the measurements involve steps of sample preparation including separation, e.g. by filtration, sedimentation and/or centrifugation, and subsequent detection measurement steps using chemical indication reactions and/or physical interactions sensitive to the analyte in question. An intricate challenge in this context is often the preparation and presentation of a proper sample for the detection without compromising the measurement, in particular if a volume of the available sample is small, and if the fluid to be analyzed is very complex. On top of that, very often in such a situation, multiple parameters are to be determined on the same sample, which imposes additional constraints of integrating a given measurement for the detection of an analyte with measurements of other parameters.

Therefore there is a need for a highly sensitive, yet simple and fast technique allowing for the selective detection of an analyte in a complex fluid, which is furthermore adapted for easy integration with other measurement techniques for determining multiple parameters of the same sample. The desired technique is furthermore required to provide for gentle separation, extraction, and/or isolation of the analyte for the detection measurements, i.e. without compromising the remaining fractions of the fluid to be analyzed.

Such a detection technique is relevant for various industries, ranging from food industry, over wastewater treatment, to pharmaceutical applications and medical devices, where known techniques often require large sample volumes and time consuming analysis procedures.

One example for the application of such a measurement technique is in relation to the detection of an analyte in body fluids, such as a patient's blood sample (whole blood sample). The analyte can be any of a laboratory's test parameters for body fluid analysis which is detectable by light, e.g. spectrophotometry. As one source of interference in the analysis of blood, hemolysis may affect the measurement of a number of blood parameters as determined in blood parameter analyzers. Disregarding a level of free hemoglobin in the blood sample may thus mislead an unaware person and as a result provide a wrong diagnosis based on the affected blood parameter value. However, reliably determining a level of free hemoglobin present in the plasma fraction of a whole blood sample hitherto involved a complex process requiring separation of the plasma fraction from the cellular components and a subsequent analysis of the separated plasma fraction. Such a procedure is time consuming and may be prohibitive in cases where only very small samples are available at a time, such as in neonatal care with a continued monitoring of blood parameters in the infant. Other approaches for measuring components present in the plasma fraction in whole blood involve the separation of a plasma fraction from cellular components by microfiltration techniques in e.g. a microfluidic device, prior to analysis of the plasma fraction in a dedicated measurement in the microfluidic device. For example, a recent scientific article by Archibong et al. and published in Sensing and Bio-Sensing Research 3 (2015), p. 1-6, discloses a miniature measuring chamber for optically analyzing a plasma fraction that has been separated from a whole blood sample. In this type of device, a miniature microfluidic chamber is attached to the interface of an optical fiber. The bottom of the microfluidic chamber consists of a porous membrane that allows fluids and chemical compounds to flow inside the device, while at the same time filtering out undesired particles. The inside of the microfluidic chamber receiving the filtrate can be optically probed through a single optical fiber in normal-incidence reflection geometry. However, due to clogging issues, the disclosed device is most useful as a disposable rather than for continued and repetitive use, since a complete washout of a sample after measurement may be difficult or at least very time-consuming and unreliable, at the further risk of cross-contamination between subsequent samples. Furthermore, in this particular type of device, additional challenges for obtaining quantitative results from the optical probing may arise, due to pressure-induced deformation of the filtration membrane resulting in a change of the optical path for probing the filtrate.

In a further example, namely applications in food industries, such as dairy industry, most traditional methods of filtering and detecting comprise filter paper, sieves and the like for visual inspection, spectrometry or bacterial counting of the residues with the above-mentioned disadvantages of requiring relatively large sample volumes and involving time-consuming measuring procedures that are detrimental to the sample, and that are incompatible with integrated multiple-parameter measurements to be performed on the same sample. Similar challenges are also encountered in the field of environmental technologies, such as wastewater analysis and treatment, where most traditional methods of filtering and detecting comprise filter papers, sieves and the like for spectrometry and bacterial counting of the residues.

Filtration-based approaches have several disadvantages when used for analyzing e.g. whole blood samples. Filtration devices inherently rely on a fluid flow of at least the filtrate through the pores of the filter from a sample feed to a filtrate analysis/measurement chamber. In through-flow geometries, the retentate (here the red blood cells) gradually clogs the filtration pores. In crossflow geometries, the retentate is lead along the surface of the filtering membrane, thereby reducing but not removing the problem with clogging, especially if the system is intended for repetitive use (more than 10-100 samples). Crossflow geometry also induces friction and shear interaction between the retentate and the surface of the filtering device.

An improved separation and measurement technique addressing these issues is disclosed in the co-pending international patent applications by the applicant, WO 2017/085162 A1 and WO 2017/085180 A1, which are hereby incorporated by reference.

Again, a particularly challenging field of application is the analysis of body fluids in a point-of-care set-up. Modern point-of-care analyzers for analyzing multiple parameters in body fluid samples, such as for the analysis of arterial blood, are subject to severe requirements and constraints of patient safety, user friendliness, short measurement times in the range of a minute or below, reliability/reproducibility, precision of the quantitative output, as well as compliance with quality management systems and safety directives for medical measurement apparatus to only name a few. The precise and compliant results have to be obtained on very small amounts of sample fluid (typically less than 100 µl, or even less than 50 µl) in agreement with the above-mentioned requirements and constraints. Most advanced point-of-care analyzer systems are therefore designed around an automated fluid handling and measurement infrastructure with a compact sensor assembly at its core. Such sensor assemblies are for repetitive use and typically have a sample space defined by sample chamber walls with miniaturized high precision sensors directly integrated in at least one of the walls. An example of such a sensor assembly for body fluids is e.g. disclosed in the European patent specification EP 2 147 307 B1. The sensor assembly of EP 2 147 307 B1 comprises electrochemical and optical sensor elements, which is particularly suitable for simultaneously measuring a plurality of different parameters in body fluid samples, such as blood parameters. It is therefore desirable that a new measurement technique fulfilling the above-stated needs for highly sensitive, simple and selective detection of an analyte in a complex fluid should be suited for integration with such a sensor assembly having a sample channel width in the millimeter range and a sample channel height in the sub-millimeter range.

Therefore, there is a need for an improved device and method for the detection of an analyte in a fluid with a fast and reliable response, which can be implemented in a miniaturized manner that would facilitate integration within an automated point-of-care analyzer system for body fluids. More generally, there is a need for an improved device and method for the detection of substances in a fraction of a complex fluid, such as a whole blood sample with a fast and reliable response, which is adapted for miniaturization and integration in a fluid analyzer system, in particular an analyzer system for multiple-parameter measurements on the same fluid sample.

According to one aspect an object of the present invention is therefore to provide an improved detection device and/or method overcoming at least some of the disadvantages of known devices, sensors, systems and/or methods for specific detection of analytes in the continuous fraction of a complex fluid, such as for detecting an analyte in a plasma fraction of a whole blood sample. According to a further aspect, an object of the present invention is to provide such a detection device, which can be miniaturized for integration with a sensor assembly.

SUMMARY OF THE INVENTION

According to one aspect the invention relates to a sensor element for detecting an analyte in a fluid sample by optical probing, the sensor element comprising:

- a translucent membrane with a front side defining a sensor surface for contacting a fluid sample, and a back side facing away from the front side,
- at the front side of the translucent membrane, a reflective layer;
- an optical input port connected to the back side of the translucent membrane for feeding probing light to the translucent membrane through the back side thereof;
- an optical output port connected to the back side of the translucent membrane for collecting an optical response from the translucent membrane through the backside; and
- an optical constriction element, the constriction element comprising a screen element arranged between the input port and the output port, thereby optically separating the output port from the input port, the constriction element further comprising a reflective element arranged at the backside of the translucent membrane and facing towards the reflective layer at a vertical distance D therefrom, thereby defining a probing region in the translucent membrane, whereby light travelling from the input port to the output port is confined to pass through the probing region, wherein at least the probing region comprises pores extending from respective openings at the sensor surface into the translucent membrane.

The sensor element is useful for analyzing complex fluids comprising a continuous fraction and a discontinuous fraction, in particular for selectively detecting an analyte in the continuous fraction of the complex fluid. The sensor element is particularly useful for miniaturization and/or integration in a fluid analyzer set-up for measuring multiple analyte parameters, e.g. in a modern arterial blood analyzer.

The fluid to be analyzed may contain at least a continuous fraction comprising the analyte. The fluid to be analyzed may further contain a discontinuous fraction, i.e. a particulate fraction. The particulate fraction may, for example, include solid particles, debris and other contaminants, biological cells (such as red blood cells) or microorganisms, liquid droplets, gas bubbles, and combinations thereof.

The fluid to be analyzed may be a whole blood sample, the plasma fraction of whole blood, spinal cord fluid, urine, pleura, ascites, wastewater, a pre-prepared fluid for any kind of injection, fluids with a constituent possible to detect by optical probing, such as spectroscopy, or a gas such as air, carbon dioxide containing gas, carbon monoxide containing gas.

The analyte may be any substance detectable by optical probing, such as a subset of molecules that may be present in the continuous phase of the fluid to be analyzed. For example, when analyzing a whole blood sample, the analyte may be a particular drug, and the measurement may be for determining a drug content in the plasma phase, e.g. to determine drug uptake and adjust dosing of the drug accordingly. In another example of analyzing a whole blood sample, the analyte may be hemoglobin or bilirubin for determining a degree of hemolysis. In yet another example of analyzing a whole blood sample, the analyte may be carbon-dioxide.

The term "fluid" refers to liquids and/or gases including complex fluids comprising a continuous phase and a discontinuous phase, such as a particulate phase. Examples of relevant fluids to be analyzed using embodiments of the present invention include, but are not limited to body fluids, in particular whole blood sample, the plasma fraction of whole blood, spinal cord fluid, urine, pleura, ascites. Further examples of relevant fluids include wastewater, a pre-prepared fluid for any kind of injection, fluids with a constituent possible to detect by spectroscopy, or a gas such as air, a carbon dioxide containing gas, a carbon monoxide containing gas.

The term "sample" refers to the part of the fluid that is used or needed in the analysis with the porous membrane of the invention.

The term "whole blood" refers to blood composed of blood plasma and cellular components. The plasma represents about 50%-60% of the volume, and cellular components represent about 40%-50% of the volume. The cellular components are erythrocytes (red blood cells), leucocytes (white blood cells), and thrombocytes (platelets). Preferably, the term "whole blood" refers to whole blood of a human subject, but may also refer to whole blood of an animal. Erythrocytes constitute about 90%-99% of the total number of all blood cells. They are shaped as biconcave discs of about 7 μm in diameter with a thickness of about 2 μm in an un-deformed state. The erythrocytes are highly flexible, which allows them to pass through very narrow capillaries, reducing their diameter down to about 1.5 μm. One core component of erythrocytes is hemoglobin which binds oxygen for transport to the tissues, then releases oxygen and binds carbon dioxide to be delivered to the lungs as waste product. Hemoglobin is responsible for the red color of the erythrocytes and therefore of the blood in total. Leucocytes make up less than about 1% of the total number of all blood cells. They have a diameter of about 6 to about 20 μm. Leucocytes participate in the body's immune system e.g. against bacterial or viral invasion. Thrombocytes are the smallest blood cells with a length of about 2 to about 4 μm and a thickness of about 0.9 to about 1.3 μm. They are cell fragments that contain enzymes and other substances important to clotting. In particular, they form a temporary platelet plug that helps to seal breaks in blood vessels.

The terms "blood plasma" or "plasma" refer to the liquid part of the blood and lymphatic fluid, which makes up about half of the volume of blood (e.g. about 50%-60% by volume). Plasma is devoid of cells. It contains all coagulation factors, in particular fibrinogen and comprises about 90%-95% water, by volume. Plasma components include electrolytes, lipid metabolism substances, markers, e.g. for infections or tumors, enzymes, substrates, proteins and further molecular components.

The term "wastewater" refers to water that has been used, as for washing, flushing, or in a manufacturing process, and so contains waste products and/or particles and is thus not suitable for drinking and food preparation.

The terms "optical" and "light" and related terms generally refer to electromagnetic radiation in the visible, infrared, and ultraviolet spectral ranges: the term "visible" typically refers to electromagnetic radiation with wavelengths in the range of 400 nm-700 nm; the term "infrared" broadly refers to electromagnetic radiation with wavelengths in the range of 700 nm-1 mm, with typical subranges of about 700 nm-3 μm in the "near-infrared", 3 μm-50 μm in the "mid-infrared", and 50 μm-1 mm in the "far-infrared"; the term "ultraviolet" or "UV" broadly refers to electromagnetic radiation with wavelengths in the range of 10 nm-400 nm, with typical subranges of 300 nm-400 nm in the "near ultraviolet", 200 nm-300 nm in the "middle ultraviolet", and 122 nm-200 nm in the "far ultraviolet". The skilled person will understand that the usefulness of the mentioned spectral ranges for a given sensor element, and in particular for a given translucent membrane material, will depend on the compatibility of spectral ranges and materials for propagating input and output light through these materials.

The term "translucent" refers to a material's property of allowing light to pass through. The term "transparent" refers to the property of a material of allowing light to pass through the material without being scattered. The term "transparent" is thus considered a sub-set to the term "translucent".

The optical constriction element blocks for cross-talk from the input to the output and at the same time effectively confines optical probing in the sensor element to occur in the probing region. The optical constriction element thereby enhances the sensitivity of the sensor element as compared to unconfined optical reflection probing of the pores, and concentrates the sensitivity to a selected portion of the sensor surface.

The optical input port is configured for feeding probing light through the back side into the translucent membrane, more particularly for injecting the probing light from the backside via an input region of the translucent membrane into the probing region. The input region is for receiving probing light through the backside of the translucent membrane and injecting the probing light into the probing region. The optical output port is configured for collecting an optical response to the probing light from the translucent membrane through the backside, more particularly for collecting an optical response from the probing region via the output region through the back side of the translucent membrane. The output region is for collecting light carrying an optical response to the probing light from the probing region and for providing the optical response at the backside of the translucent membrane. By both injecting the probing light and collecting the optical response from the back side of the translucent membrane, a compact design is achieved allowing for the integration of the sensor element in a miniaturized sample assembly with a very small sample chamber, which is designed for analysing very small amounts of a sample fluid.

The optical constriction element is arranged between the input port and the output port. The optical constriction element forms an optical constriction separating the input from the output so as to prevent direct cross-talk from the input to the output, e.g. due to glare effects. The optical constriction element furthermore confines the probing light in a vertical direction, wherein the optical constriction is configured to cause probing light entering the probing region from an input side to undergo multiple reflections before the light leaves the probing region at an output side. The term "multiple reflections" here refers to at least two reflections from the reflecting layer at the front side of the translucent membrane and one reflection from the reflecting element; or at least three, at least four, at least five or an even higher minimum number of reflections from the reflecting layer and the same number minus one of reflections from the reflecting element.

The optical constriction element defines a probing region connecting the input region of the translucent membrane to the output region of the translucent membrane wherein at least the probing region comprises pores extending from respective openings at the sensor surface into the translucent membrane. The pores are in fluid communication with a fluid sample in contact with the sensor surface as further detailed below. The pores in the translucent membrane are preferably dead end pores as also further detailed below.

Any light entering the input region of the translucent membrane, but which does not progress to the probing region, is blocked by the screen element of the optical constriction element, if not otherwise lost, and is thus prevented from reaching the output region. Only probing light that has interacted with pores of the translucent membrane in the probing region is therefore collected by the output port and passed to a detector for analysing the optical response of the sample fluid fraction in the pores to the probing light. The optical constriction element may thus be said to confine the sensitivity of the detector to the probing region.

The probing region is defined in a vertical direction perpendicular to the sensor surface between the reflective layer and the reflective element of the optical constriction element, and in a transverse direction parallel to the sensor surface by the extent of the reflective element of the optical constriction element in that direction. By defining a vertically confined optical probing region in the translucent membrane with pores communicating with the fluid sample, and by forcing the probing light to pass through that region, a significantly enhanced interaction between the probing light and the sample fluid in the pores is achieved, thereby enhancing the optical probing sensitivity of the sensor element as compared to a simple reflection geometry.

The vertical confinement causes injected probing light reaching the reflecting layer within the probing region to be reflected towards the reflective element at the back side, which reflects the light back to the reflective layer at the front side where it is reflected again and so forth until the light reaches the output region, from where it may be collected by the output port for detection. The vertical confinement within the probing region thus increases the probability for interaction between the probing light and the pores of the translucent membrane. The interaction between the pores and the incident probing light typically causes a diffuse spreading of the light, where on the one hand optical response-signal intensity significantly decreases with each scattering event, but where on the other hand sensitivity with respect to the analyte detection significantly increases with each scattering event. The number of scattering interactions between the probing light and the pores thus depends, besides on the porosity of the translucent membrane, on the geometry of the confinement. In particular, for a given porosity of the translucent membrane in the probing region, the minimum number of scattering events is essentially determined by the geometry of the probing region. It may be noted that short, direct paths from the input to the output having a lower probability for scattering interaction than longer, possibly less direct paths. Short, direct paths from the input to the output including less scattering events may therefore tend to dominate the optical response as observed by the detector for a given geometry of the sensor element.

The optical constriction element allows for defining the geometry of the probing region in a simple, yet effective manner, in particular by shaping and dimensioning of the optical constriction element, e.g. using a width of the reflective element and the distance of the reflective element from the reflective layer as design parameters in combination with an appropriate shape of the screen element to block the direct passage of light from the input port to the output port.

The reflective element defines in combination with the reflective layer the geometry of the probing region. The width Wr of the reflective element as seen in the transverse direction parallel to the sensor surface defines a probing region width w in the transverse direction; and the distance D of the reflective element from the reflective layer as seen in the vertical direction perpendicular to the sensor surface defines a probing region height h in the vertical direction. In other words, the probing region width w corresponds to the reflective element width Wr and the probing region height h corresponds to the distance D between reflective element and the reflective layer.

The optical constriction element may be dimensioned in relation to a dimension of the surface of the sensor element. The sensor element has at the sensor surface, i.e. at the front side of the translucent membrane, a sensor element width Ws as seen in a transverse direction parallel to the sensor surface. To achieve a concentration of the sensitivity to a portion of the sensor surface, the reflective element width Wr is less than the sensor surface width Ws. In a corresponding manner, the probing region has a width w as seen in a transverse direction parallel to the sensor surface that is less than a width of the sensor surface Ws as seen in the transverse direction.

A back side width Wb of the translucent membrane as seen in the transverse direction may also be defined at the back side of the translucent membrane and the optical constriction element may also be dimensioned in relation to the back side width Wb of the sensor element. In order to allow an efficient coupling of probing light into the translucent membrane through the back side of the translucent membrane, the reflective element width Wr, and the corresponding probing region width w may typically be less than or about half the width or even less than or about a third of the width of the translucent membrane as seen in the transverse direction at the back side.

The back side of the translucent membrane is typically parallel to the front side; an additional transparent backing may be applied to the back side in order to provide a mechanical support for stiffening/reinforcing the translucent membrane from the back side; The backing may be a transparent padding filling voids between the translucent membrane and further optical components of the sensor element, such as the input port, the output port, and/or the optical constriction element. The sensor element is typically held together in a mechanical mount, such as in a sensor element housing. The reflective element of the optical constriction element may be in direct contact with the back side of the translucent membrane or may be arranged at a slight distance therefrom, i.e. the thickness of the translucent membrane typically determines the distance D between the reflective element and the reflective layer. The translucent membrane may have a thickness that is essentially equal to the distance D desired for a particular design of the probing region. However, in some embodiments, the translucent membrane may have a thickness that is less than the distance D desired for a particular design of the probing region. For example, the reflective element may be placed at a distance Db from the backside of the translucent element depending on the desired design of the probing region height. For example, the distance Db may be required to be less than two times the thickness, less than the thickness, or less than half the thickness of the translucent membrane. Any void between the back side of the translucent membrane and the reflective element may be filled out with a transparent padding component. Preferably a transparent padding is refractive-index matched with the translucent membrane to within tolerances, such as to within 5%, preferably within 2%, and most preferably to within 1%.

The sensor element has a sensor surface for contacting a fluid to be analyzed. The sensor surface is formed at the front side of the translucent membrane and the reflecting layer applied to the front side. The translucent membrane contains small pores, preferably dead end pores, extending from the front side, through the reflective layer into the translucent membrane. Each of the small pores has an opening through which it can communicate with a fluid space at the front side of the translucent membrane. The pores thus penetrate the reflecting layer to allow for fluid communication between the pores and the fluid space. The pores extend from the respective opening at the front side into the translucent membrane in a direction towards the backside.

The pores are preferably "dead end" meaning that the pores end within the translucent membrane. The dead end pores do not continue all the way through the translucent membrane to the backside or to any common reservoir or recipient inside the membrane. The pores are only in fluid communication with the fluid space at the front side of the translucent membrane. Note that in some embodiments the dead end pores can be crisscrossing and at least some of the pores may thus be connected to each other forming an X-shape, a Y-shape, a V-shape, or similar interconnected shapes. Such a configuration is equally considered as dead end, since the pores are only filled from the front side and no significant net mass transport passing through the pores occurs under operation, even if they cross each other.

The translucent membrane may be made from transparent polymer membranes with pores fabricated therein using, for example, so-called track-etching techniques as disclosed in the co-pending international patent applications, WO 2017/085162 A1 and WO 2017/085180 A1, which are hereby incorporated by reference.

The pores form vials/cuvettes for selectively receiving an analyte from a first fraction of the fluid, in particular via diffusion/diffusive transport, whereas a particulate fraction is effectively prevented from entering the pores. These vials/cuvettes are placed at least in the probing region for efficient interaction of probing light with the analyte. The openings of the pores are dimensioned such that a particulate fraction of the fluid to be analyzed is kept outside the pores, while allowing an analyte from a further fraction, e.g. a continuous fraction, to enter through the pores into the translucent membrane, in particular within the probing region defined by the optical constriction element, so that the probing light injected from the input port can interact with the analyte and thus detect the analyte by optical probing. By appropriately dimensioning the opening of the pores at the front side it is possible to prevent e.g. red blood cells of a whole blood sample at the sensor surface from entering the pores, while allowing relevant components in the plasma fraction of the whole blood sample to enter the pores, wherein relevant components are substances present in the plasma fraction of the whole blood sample (or more generally in the relevant fraction of the fluid sample) and that are to be measured/detected using the sensor.

By this configuration, it is achieved that a small, but representative analyte fraction is gently extracted from the complex fluid and efficiently exposed to the probing light in the probing region with a high degree of overlap. This separation is achieved in a particularly simple and fast manner, since the probing region is arranged directly at the surface of the translucent membrane with the pores penetrating directly into the translucent membrane, and with a relatively short distance from their respective openings at the sensor surface to the location of probing, thus facilitating a particularly rapid diffusive exchange of the sample.

Typical cross-sectional dimensions of the pores are in the micron and sub-micron range down to about 100 nm. Analyte transport into and out of the pores is achieved by diffusion. For efficient operation, the pores are filled with a priming fluid, which preferably is filled into the pores in a priming step, e.g. prior to performing the first detection measurement. The priming fluid may not affect the fluid to be analyzed. The priming fluid thus has to be compatible with the fluid to be analyzed. Advantageously, the priming fluid may be a rinsing fluid, such as an aqueous buffer solution, which may also be used for rinsing a sample chamber during filling, emptying and re-filling procedures for replacing samples of a fluid to be analyzed. The rinsing fluid may also be a reference fluid or a calibration fluid.

Advantageously according to some embodiments, the pores are filled with a liquid. Priming the pores with a known liquid allows for extracting a subsample representative of the relevant components in the fluid to be analyzed into the pores by diffusion alone. This provides for a fast, efficient and well-controlled exchange of the analyte via the pores into and out of the optical probing region. Advantageously according to some embodiments, the liquid is an aqueous solution. This is particularly useful for the detection of water-soluble analytes. Alternatively, it is conceivable that the pores are filled with a non-aqueous liquid, which is particularly useful e.g. when the fluid to be analyzed is also a non-aqueous liquid.

Under operation, the front side of the translucent membrane may be contacted with e.g. a whole blood sample or a fluid. The small pores in the translucent membrane communicate with the whole blood sample or fluid through the openings in the front side. The pore openings are dimensioned to selectively extract a sub-sample of the plasma phase of the whole blood sample or to extract a sub-sample of the fluid including the analyte. No red blood cells can enter the pores through the openings on the front side of the translucent membrane. Nothing larger than the pore diameter can enter the pores which excludes e.g. any debris included in the fluid. As mentioned, the pores are preferably dead end, only communicating with the front side of the translucent membrane, i.e. the sub-sample is extracted for optical probing inside the pores and after the measurement discharged again through the same openings in the front side of the translucent membrane. The sub-sample volume corresponds to the total internal volume of the pores. No filtration and net mass transport of any filtrate occurs through the pore containing layer—neither into any common filtrate recipient nor to any filtrate outlet. The optical detection will then be performed only on the sub-sample contained in the pores. The reflective layer optically separates the optical probing region in the translucent membrane from the fluid space containing the whole blood sample or the fluid. By optically separating the probing region from the fluid space, any contribution of the intact red blood cells of the whole blood sample or of the debris in the fluid to the probed signal can be effectively suppressed. The measurement is thus specific to the content of analyte in the fluid.

The small sub-sample with a representative content of the relevant components may be transferred to the pores in any suitable manner. The small dead end pores allow for a very efficient and fast extraction of the sub-sample for optical probing from a whole blood sample or a fluid through the openings in the front side by means of capillary forces and/or diffusion. In a typical operation mode, the front side surface of the translucent membrane is contacted by a rinsing fluid prior to contacting the front side with a whole blood sample or fluid that is to be analyzed. Thereby, the pores are 'primed' with a prefill of a liquid that is compatible with the whole blood sample or the fluid, and in particular a liquid that is compatible with the plasma phase if the fluid is whole blood, such as an aqueous solution commonly used for rinse, calibration and/or quality control purposes in blood analyzers. Typical rinse liquids used for e.g. washout in whole blood analyzer systems may be used as such a liquid. Rinse liquids are aqueous solutions comprising $K^+$, $Na^+$, $Cl^-$, $Ca^{2+}$, $O_2$, pH (i.e. $H^+$), $CO_2$, and $HCO^{3-}$ in concentrations corresponding to human plasma. When the whole blood sample or fluid is then brought in contact with the front side surface that is primed with a plasma compatible liquid/fluid compatible liquid, a representative sub-sample of components in the plasma phase of the whole blood sample or of the fluid is extracted and transferred in a very efficient and gentle manner by means of diffusion of the relevant components into the prefilled pore. In particular, any concentration gradient in the content of the analyte between the fluid and the reference liquid in the pores drives a diffusive transfer, thereby producing in the pores a sub-sample with an analyte concentration representative of the analyte concentration in the fluid. In another operation mode, it may also be conceived to directly contact the front side of a dry sensor element with a whole blood sample or a fluid. Further preferably in this operation mode, an inside surface of the pores is hydrophilic, thereby extracting the sub-sample from the whole blood sample or fluid at the front side of the translucent membrane into the pores by means of capillary forces.

The sub-sample volume corresponds to the total internal volume of the pores. No filtration and net mass transport of any filtrate occurs through the pore containing layer during measurement—neither into any common filtrate recipient nor to any filtrate outlet. The optical detection is then performed only on the sub-sample contained in the pores. The confinement of the input light to the translucent membrane optically separates optical probing from the fluid space containing the whole blood sample or the fluid. By optically separating the optical probing from the fluid space, contributions of the intact red blood cells of the whole blood sample or of the debris in the fluid to the probed signal can be effectively suppressed. The measurement is thus specific to the content of analyte in the fluid.

The content of the pores can conveniently be probed optically from the back side of the translucent membrane, or more generally, from the side of the reflective layer facing towards the translucent membrane, wherein the reflective layer at the front side optically separates an optical probing region comprising the pores from the fluid contacting the front side of the translucent membrane. The reflective layer is adapted to reflect light reaching the reflective layer from directions from the backside of the translucent membrane, thereby preventing probing light from reaching and interacting with the fluid at the front side of the translucent membrane. The optical probing is thus selectively performed only on the sub-sample inside the pores. The additional optical constriction element concentrates the optical probing of the fluid sample contacting the sensor surface to only occur in a portion of the sensor surface essentially corresponding to a vertical projection of the probing region on the sensor surface. The concentration effect of the optical constriction defined by means of the optical constriction element is particularly advantageous and useful for controlling where on the sensor surface facing a sample space the measurement is actually taken. Preferably, such concentration is to a centre portion of the sensor surface (by arranging the optical constriction in a centre portion of the translucent membrane) so as to prevent reminiscent contamination that may tend to stick to the edges and in corners of the sample space from affecting the measurement. Thereby a more reliable and reproducible measurement result can be obtained.

Further according to some embodiments, the sensor element further comprises a light source connected to the optical input port, wherein the light source is configured for emitting probing radiation. Further according to some embodiments, the sensor element further comprises a detector connected to the optical output port, wherein the detector is configured for detecting light emerging from the probing region in response to an illumination of the probing region through the input port by the light source, and wherein the detector is adapted to generate a signal representative of the detected light. The light source may in principle be any light source that transmits light in a region where the analyte in the pores absorb light or otherwise provides an optically stimulated response in order for the system to work. Due to their properties with respect to size, weight, efficiency etc. light emitting diodes are preferred for embodiments intended for miniaturization and/or integration in an assembly. The detector may be any optical detection set-up suited for detecting the optical response received from the optical output port, and for analyzing that optical response in order to generate an output signal indicative of the analyte to be detected. Advantageously according to one embodiment the detector may include a spectrophotometer and an optical probing device is configured for the spectrophotometric analysis of the light emerging from the probing region. This allows for resolving the spectral signature of one or more relevant components in the light emerging from the sub-sample in the probing region. For purposes of miniaturization and compactness, e.g. in the context of point-of-care set-ups, the detector may include a photodiode or a spectrometer that is able to detect the absorption in the entire spectrum. Alternatively, an array or diodes may be used, where each diode emits light at different wavelengths, and a photodiode is used as a detector. The diodes may be multiplexed to emit light in different intervals. The absorption is then found by comparing the lights emitted from a diode in that particular interval compared with the light detected by the photodiode.

The following embodiments provide rules and ranges for advantageous dimensioning of the optical constriction element for a sensor element, and thus in a corresponding manner for dimensioning the probing region of a sensor element as defined by means of the optical constriction element. The given dimensioning rules and ranges are particularly useful for implementing the above-discussed advantages in the context of miniaturization and/or integration of the sensor element with a sensor assembly for small sample volumes, such as for a medical parameter analyser for body fluids in a point-of-care set-up.

According to some embodiments of the sensor element, the reflective element has a width Wr as seen in a transverse direction parallel to the sensor surface that is less than a width of the sensor surface Ws as seen in the transverse direction, or less than half said sensor surface width Ws. A sensor surface width Ws may thus be larger than the reflective element width Wr and the corresponding probing region width w. A typical sensor surface width Ws is preferably at least two times, at least three times, or even at least five times the width Wr of the reflective element and/or the corresponding width w of the probing region. Thereby a sensitive portion of the sensor surface as determined by the probing region is concentrated, preferably to a central portion of the sensor surface as seen in the transverse direction.

Advantageously according to some embodiments, a sensor surface width Ws of a sensor element for use in a point-of-care sensor assembly is less than 10 mm, less than 5 mm, less than 3 mm, and/or a sensor surface width Ws of such a sensor element is at least 1 mm, or at least 2 mm.

Further according to some embodiments of the sensor element, the distance D of the reflective element from the reflective layer as seen in the vertical direction is less than 500 µm, less than 200 µm, less than 100 µm, or about 50 µm. By adjusting the distance D, or correspondingly the height of the probing region, an aperture to the probing region and thus the amount of probing light that may enter the probing region from the input region is increased, thereby increasing the intensity of the optical response at the output side of the probing region. However, for a given reflective element width Wr, an increase of the distance D also has the consequence that fewer reflections are required for the light to pass in the transverse direction through the probing region. An increase of the distance D thus leads to a reduction in the vertical confinement imposed by the optical constriction element and ultimately in a reduced sensitivity of the sensor element with respect to the detection of a given analyte in the sub-sample in the pores. A too large distance may even lead to a direct leakage of probing light from the input side to the output side of the optical constriction.

Further according to some embodiments of the sensor element, a width Wr of the reflective element as seen in the transverse direction is less than 5 mm, less than 2 mm, less than 1 mm, or about 0.5 mm.

Further according to some embodiments of the sensor element, an aspect ratio of the distance D of the reflective element from the reflective layer in the vertical direction with respect to a width Wr of the reflective element in a transverse direction parallel to the sensor surface is at least 1:2, or at least 1:5 at least 1:10, or at least 1:20, or at least 1:50.

According to a further aspect, a sensor assembly comprises: a sensor element according to any of the embodiments disclosed herein; and a sample chamber comprising a sample space for holding a fluid sample defined by chamber walls; wherein the sensor element is arranged in one of the chamber walls, wherein the sensor surface faces towards the sample space. Thereby, an assembly is provided that integrates a sensor element according to any of the embodiments as disclosed herein in the chamber wall of a sample chamber facing towards the sample space such that a fluid sample received in the sample space can contact the sensor surface, in particular the sensitive portion of the sensor surface as defined by the optical constriction, for performing an optical probing measurement on the fluid sample. The assembly may be configured for use in an automated measurement system as further disclosed below.

Further according to some embodiments, the sensor assembly further comprises an inlet and an outlet defining a direction of flow from the inlet towards the outlet for fluid handling in the sample chamber, wherein the sensor element is oriented such that the transverse direction is perpendicular with respect to the direction of the flow, preferably in a central position with respect to the sample chamber as seen in the transverse direction. Thereby artefacts resulting from edge effects, e.g. from reminiscent contamination at side walls of the sample chamber may be suppressed.

Further according to some embodiments of the sensor assembly the probing region width is less than a width Wa of the sample space as seen in the transverse direction of the sensor element, or less than half of said sample space width Ws. Thereby artefacts resulting from edge effects, e.g. from reminiscent contamination at side walls of the sample chamber may be suppressed.

According to a further aspect of the invention a system for analyzing a fluid comprises (a) a fluid chamber with inlet and outlet ports for feeding and discharging the fluid; (b) a first sensor adapted to provide a first signal representative of a level of an analyte in the fluid. Advantageously according to some embodiments, the system for analyzing a fluid further comprises (c) one or more further sensors, each further detector being adapted to provide a respective further signal representative of an analyte of the fluid; wherein the first and further sensors are operable to obtain the first and the one or more further signals from the same fluid, wherein the first sensor is configured as a sensor element for the optical detection of an analyte according to any of the embodiments disclosed herein.

The following embodiments disclose advantageous rules and ranges for dimensioning the pores, in particular for use in a sensor element in the context of optically probing body fluids.

Further according to some embodiments of the sensor element, a cross-sectional dimension of the openings of the pores is about 1 µm or less, about 800 nm or less, preferably about 500 nm or less, or even about 400 nm or less. The cross-sectional dimension of the pore openings is preferably adapted so as to balance size selectivity (smaller pore opening diameter) against a rapid exchange of sub-sample/analyte (larger pore opening diameter)—depending on the application. The given values are, for example, particularly useful for the analysis of body fluids, such as whole blood with an analyte in the plasma fraction.

Further according to some embodiments of the sensor element, a cross-sectional dimension of the openings of the pores is at least 200 nm. The cross-sectional dimension of the pore openings is preferably adapted so as to balance size selectivity (smaller pore opening diameter) against a rapid exchange of sub-sample/analyte (larger pore opening diameter)—depending on the application. The values of the recited range are, for example, particularly useful for the analysis of body fluids, such as whole blood with an analyte in the plasma fraction.

Further according to some embodiments of the sensor element, a length of the pores in an axial direction along the pores is less than 100 µm, less than 50 µm, and preferably less than 30 µm. The length of the pores is preferably adapted so as to balance a desire to provide an increased sample volume (longer pore length) for interaction with the optical probing field in the probing region against rapid exchange of sample/analyte (shorter pore length)—depending on the application. The given values are particularly useful for the analysis of body fluids, such as whole blood with an analyte in the plasma fraction of the whole blood sample.

Further according to some embodiments of the sensor element, a length of the pores in an axial direction along the pores is at least 1 µm, at least 2 µm, at least 5 µm, and preferably at least 10 µm. The length of the pores is preferably adapted so as to balance a desire to provide an increased sample volume (longer pore length) for interaction with the optical probing field in the probing region against rapid exchange of sample/analyte (shorter pore length)—depending on the application. The given values are particularly useful for the analysis of body fluids, such as whole blood with an analyte in the plasma fraction of the whole blood sample.

Further according to some embodiments of the sensor element, the pores are straight. Straight-shaped pores facilitate an effective transport through the length of the pore, thereby achieving a fast sub-sample/analyte exchange.

Further according to some embodiments of the sensor element, the pores are track-etched pores formed by exposing the translucent membrane to a directional ion bombardment followed by chemical etching. Track-etching is particularly well-suited for forming straight-shaped and narrow, yet deep pores of e.g. the above-mentioned dimensions. The pores may be formed in a unidirectional arrangement resulting, e.g. from a single directional ion bombardment exposure. Alternatively, the pores may be formed in a multi-directional arrangement by providing multiple directional ion bombardment exposures from different directions. The pore arrangements may thus e.g. be created/defined by one or more directional ion-bombardment exposures prior to performing the etching steps.

A suitable translucent membrane may be produced e.g. from transparent polymer membranes with so-called track-etched pores, similar to those available from the company IT4IP (IT4IP S.A./avenue Jean-Etienne Lenoir 1/1348 Louvain-la-Neuve/Belgium) with the modification that the pores are closed at one end. Through-going pores in the membranes may be closed e.g. by laminating a backing sheet to the backside of the porous membrane, or by decelerating the ions such that the ion-bombardment tracks, and thus the pores etched following these tracks, stop within the transparent polymer membrane to form dead end pores. The membrane is typically backed by a stiff transparent element to provide adequate mechanical strength to the translucent membrane.

The translucent membrane should preferably be made of a material that does not absorb light and at the same time it should be possible to produce the dead end pores in the material e.g. by track etching the material. A material that is suitable for this is, for example, polyethylene terephthalate (PET or PETE) or an analogue of PET (polyethylene terephthalate polyester (PETP or PET-P)) or a polycarbonate (PC). The translucent membrane may comprise a hydrophilic coating of e.g. polyethylene glycol (PEG) to increase the diffusion into the pores. The hydrophilic coating may be chosen so as to configure the sensor element for a certain mode of operation of the sensor element. In some modes of operation, the sensor element will never dry out, once it is in use and it therefore only needs to be hydrophilic at startup. For other modes of operation of the sensor element, a coating is applied that permanently keeps up the hydrophilicity throughout the entire lifetime of the sensor element. This allows for an operation mode where the sensor element is allowed to dry out between subsequent uses, yet maintaining a fast sub-sample extraction from a liquid sample presented at the sensor surface. Consequently a fast measurement turn-around from contacting the sensor surface with a liquid sample to obtaining an optical probing result can be achieved even though the sensor element is allowed to dry out between uses.

Advantageously according to some embodiments of the sensor element, a porosity of a given volume of the translucent membrane comprising pores, at least within the probing region, is between 50% and 5% by volume, between 30% and 10% by volume, or about 15% by volume. The porosity may be characterized in terms of the volume of the voids created in the translucent membrane by the pores, i.e. the pore volume, wherein the pore volume is referred to the volume of the translucent membrane penetrated by the pores. This volume is here defined as the volume between the front side area over which the pores are distributed and the identical parallel area shifted into the translucent membrane by the maximum depth of penetration of the pores into the translucent membrane as seen in a vertical direction perpendicular to the sensor surface.

In addition thereto, the porosity may be further characterized in terms of the integrated pore volume, which is equal to the sub-sample volume that is available for optical probing. The pore volume may conveniently be expressed as an equivalent pore volume depth DELTA, which is the pore volume referred to the corresponding front side area over which the pore openings are distributed. Accordingly, the porosity of the translucent membrane can be converted into an equivalent pore volume depth DELTA as follows. The pores having an opening within a given front side area A have a total pore volume V. The equivalent pore volume depth is then calculated as the total pore volume divided by the given front side area: DELTA=V/A.

Advantageously according to some embodiments, an equivalent pore volume depth DELTA is less than 20 μm, or less than 15 μm, or less than 10 μm, or in the range from 3 μm to 5 μm, wherein the equivalent pore volume depth DELTA is defined as the total volume of the pores V divided by the front side area A over which the openings of the pores are distributed. Thereby, a small sub-sample with a representative concentration of relevant components is obtained. A small sub-sample volume is desirable to promote a fast sub-sample exchange, thereby reducing response time of the sensor element, and cycle time of measurements using the sensor element. A small subsample volume is further desirable in order to avoid effects of depletion of boundary layers of a plasma fraction in a whole blood sample close to the front side of the translucent membrane. Such depletion effect may otherwise occur in small, still standing samples, where e.g. red blood cells may obstruct an efficient diffusive exchange of relevant components from the volume of the whole blood sample towards the boundary layer at the front side of the translucent membrane, if the equivalent pore volume depth exceeds a critical value.

Preferably, an equivalent pore volume depth DELTA is at least 1 μm, alternatively at least 2 μm, or in the range from 3 μm to 5 μm, wherein the equivalent pore volume depth is defined as above. A larger sub-sample volume is desirable to achieve a better signal-to-noise level due to a larger sub-sample volume contributing to the optically probed information on the relevant components in the plasma.

Further according to some embodiments, a useful compromise between reducing response time, reducing cycle time, and/or avoiding depletion effects in small still standing whole blood samples or fluids on the one hand, and a required or desired signal-to-noise ratio on the other hand is found for an equivalent pore volume depth DELTA in the range from 1 μm to 20 μm, preferably in the range from 2 μm to 10 μm or at about 4 μm-5 μm.

Further according to some embodiments of the sensor element, an inner wall surface of the pores is hydrophilic, e.g. coated with a hydrophilic coating. Thereby, an efficient capillary driven filling of dry pores with liquid is achieved. Furthermore, a hydrophilic coating prevents certain hydrophobic substances, such as hydrophobic dyes, hemoglobin, and other proteins, from depositing inside the pores that would otherwise lead to a gradual fouling of the sensor, which is difficult to wash out with an aqueous solution.

Advantageously according to some embodiments, the reflective layer is made of metal. Such metallic coatings can be applied in a relatively cost-effective, yet well-controlled manner with adequate reflectivity.

Advantageously according to some embodiments, the reflective layer is made of platinum, palladium or an alloy comprising as a principal component platinum or palladium. These materials exhibit a good reflectivity in the spectral range of the electromagnetic spectrum (deep violet to blue) that is relevant for the detection of certain substances, e.g. free hemoglobin, for example by absorbance probing. Furthermore, these materials are biocompatible and do not e.g. introduce artificial hemolysis. Furthermore, these materials are chemically stable in general and in particular in the chemical environment of biological fluids, such as a whole blood sample or any of the previously mentioned body fluids.

Alternatively, according to some embodiments, the reflective layer may be made of silver or aluminum. Further advantageously according to some embodiments, the surfaces of the reflective layer facing towards the sample volume are encapsulated by an additional passivation layer, thereby enhancing the lifetime of the device, in particular when using silver or aluminum as a material for the reflective layer. A suitable passivation may be made of e.g. a thin layer of $SiO_2$ which preferably is made transparent and has to be sufficiently thin so as to not obstruct the opening of the pores. These materials may also provide a good reflectivity in the relevant spectral range (red), are biocompatible and chemically stable in the environment.

Advantageously according to some embodiments, the thickness of the reflective layer is between 10 nm-100 nm depending upon the used metal. Such a layer thickness allows for applying the reflective layer by an evaporation technique without clogging of the openings of the pores at the sensor surface. At the same time, the layer thickness has to be sufficient to provide adequate attenuation of light propagating to the sample volume in order to ensure an enhanced optical separation between the probing region and the sample volume containing the fluid to be analyzed, e.g. a whole blood sample. Preferably, the transmitted light is less than 5%, less than 1% or even less than 0.1% in the spectral range of detection, i.e. in the spectral range from which a signal representative of the relevant component is developed. For example, for measuring hemoglobin in the plasma fraction of a whole blood sample suitable spectral ranges are from 380 nm to 700 nm, from 380 nm to 450 nm, from 400 nm to 430 nm, or at about 416 nm.

According to a yet further aspect of the invention, a method of optically detecting an analyte such as hemoglobin in a fluid is provided. The method implements the steps of optical probing as discussed herein in the disclosure of the sensor element, assembly and system, and at least achieves the same advantages as discussed with respect to the respective embodiments.

According to some embodiments, a method of optically detecting an analyte in a fluid comprises the steps of providing a sensor element as disclosed above; contacting the sensor element with a reference liquid so as to fill the pores with the reference liquid; contacting sensor surface with a fluid; waiting for a diffusion time to allow for diffusion of the analyte in the fluid into the pores to stabilize; injecting input light into a probing region defined by the optical constriction element; propagating the input light through the probing region to interact with the pores in the probing region; collecting light emitted from the pores in response to the input light, thereby optically probing the fluid inside the pores; and, based on the result of the optical probing, establishing an analyte level of the fluid. Preferably, the reference liquid is an aqueous solution that is compatible with the fluid, and in particular compatible with the fraction thereof that may enter the pores, such as a liquid for rinse, calibration and/or quality control. In some embodiments, it may be conceived to omit the step of contacting the sensor surface with a reference liquid prior to introducing the fluid. However, including the step allows for a purely diffusive sub-sample extraction, which is very efficient and leads to a surprisingly fast detection response and surprisingly short cycle time for the measurement. Advantageously, an analyte is detected optically in the pores by the color change due to the presence of the analyte in representative amounts in the extracted sub-sample. Advantageously according to some embodiments, optical probing comprises performing a spectrophotometric analysis of the light emerging from the pores as an optical response to the probing input light. Advantageously according to some embodiments, optical probing is measuring the absorbance. This has the advantage of a relatively simple, yet effective set-up.

While the present invention has mainly been described herein with reference to uses in the context of the analysis of blood analysis, the skilled person will understand that the present invention is also useful in other context in an equivalent manner without leaving the scope of the present invention.

For example, the sensor element can be used in a reading device for color producing/consuming assays. Such a device has the advantage that it is not necessary to perform separation steps in order to produce plasma before the assay. By way of example, the following types of assays may be performed with a device comprising a sensor element according to embodiments of the invention: sandwich assays, where the receptor ligand could be bound inside the membrane channels; Assays where one part is bound in the pores, e.g. Bromocresol Green Albumin assay, which use Bromocresol Green (BCG), to form a colored complex specifically with albumin. The intensity of the color, measured at 620 nm, is directly proportional to the albumin concentration in the fluid; Enzyme activity assays as e.g. the aspartate aminotransferase (AST) activity assay kit, where the transfer of an amino group from aspartate to α-ketoglutarate results in the generation of glutamate, resulting in the production of a colorimetric (450 nm) product proportional to the AST enzymatic activity present.

The sensor element may also be used in non-medical applications, such as monitoring tasks for beer brewing, wastewater analysis, food testing and in dye production. In beer brewing a precise color is desired. The sensor element could be used to determine whether or not the beer has the desired color or not by measuring on the liquid and compare the reading with a liquid of correct color. Wastewater could be analyzed for presence or absence of a component. In food testing, liquids such as milk, juices and other slurries, the sensor element could be used for analysis for presence or absence of a constituent or analyte. The sensor element could further be useful in the production of certain chemicals, e.g. in the dye industry, to obtain metrics during the production of a desired color, a desired content or other chemical property of the product.

Advantageously according to some embodiments, the sensor element, or a blood analysis system comprising such a sensor element, further comprises a processor configured for comparing the signal generated by the detector with a predetermined calibration reference to develop a quantitative measure of the analyte level in the fluid. Further advantageously according to some embodiments, the calibration reference is obtained on a dye-based calibration solution, such as an aqueous solution comprising tartrazine dye. Preferably, the dye-based aqueous solution is prepared from a typical rinse liquid with the addition of the calibration dye, such as tartrazine.

BRIEF DESCRIPTION OF THE DRAWINGS

Embodiments of the invention will be described in more detail in connection with the appended drawings, which show in FIG. 1 schematically a cross-sectional view of a sensor assembly with a multiple reflection porous membrane sensor element according to one embodiment, FIG. 2 schematically, a top elevational view of a portion of the sensor assembly with the sensor element of FIG. 1; and in FIG. 3 a diagram of a liquid sample analyser according to one embodiment.

DETAILED DESCRIPTION

Figure 1:
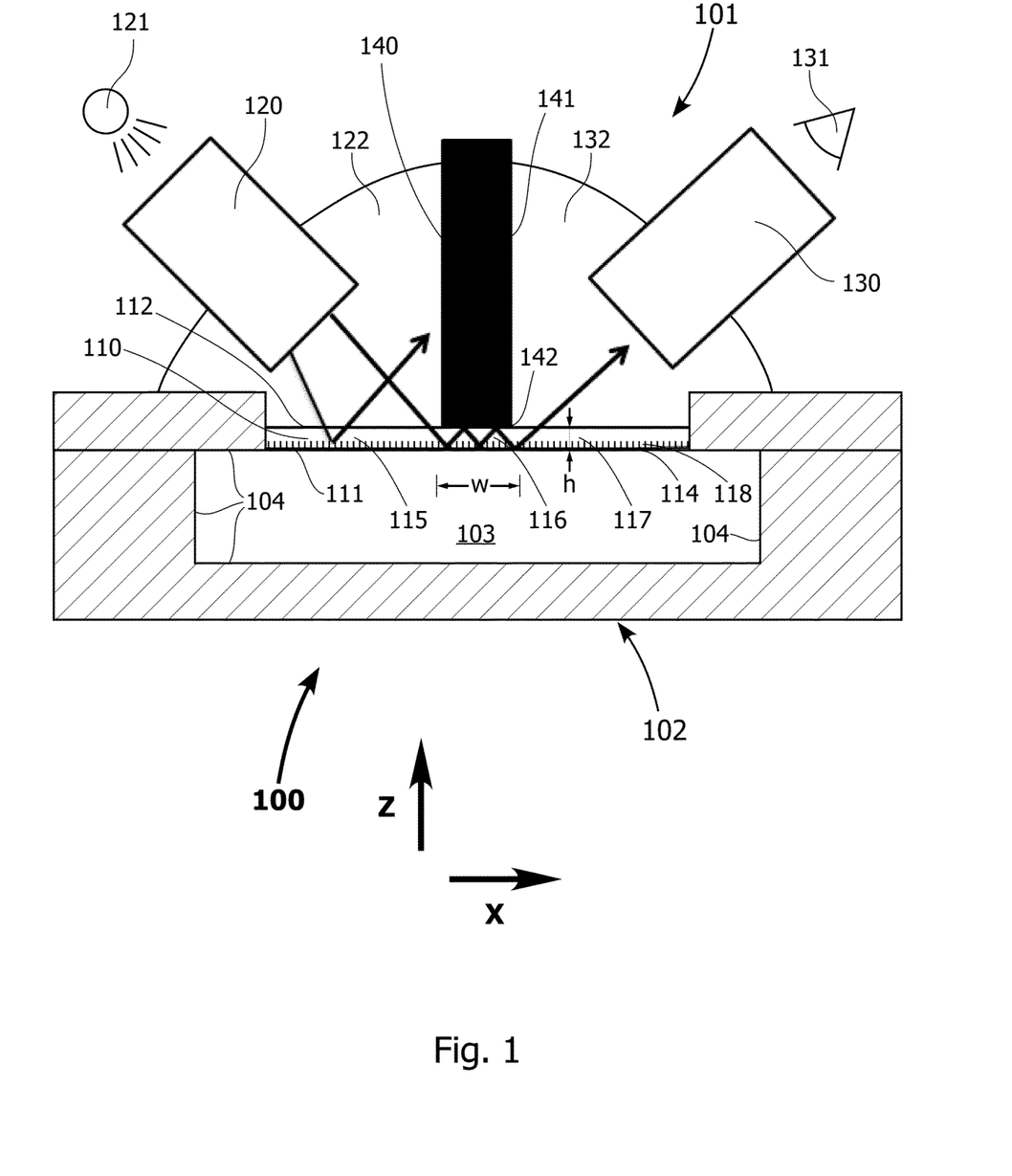
Figure 2:
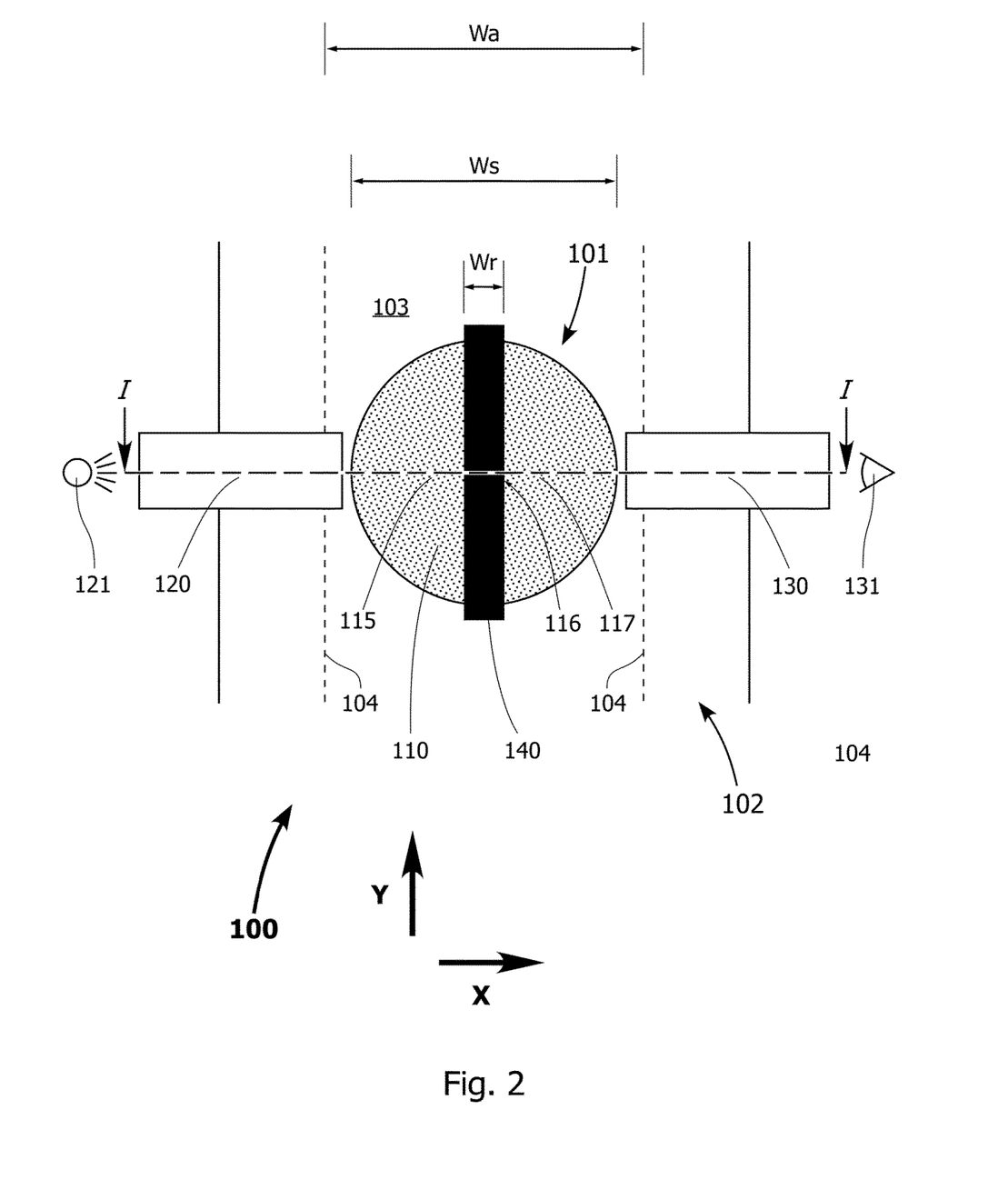

Referring to FIG. 1 and FIG. 2 a sensor assembly with a sensor element according to one embodiment is now described. FIG. 1 shows schematically a cross-sectional view of the sensor assembly 100 along line I-I in FIG. 2. FIG. 2 is a schematic top elevational view of the sensor assembly 100.

The sensor assembly 100 has a sensor element 101, which is integrated with a sample chamber 102. The sample chamber 102 defines a sample space 103 with chamber walls 104. The sensor surface is integrated in one of the chamber walls 104 facing the sample space 103, and forming a window with a sensor surface width Ws in a transverse direction of the sensor element. The sample chamber 102 is for holding a fluid sample and presenting the fluid sample to the sensor element 101 in contact with the sensor surface for optical probing the fluid sample. The sample chamber has a width Wa in the transverse direction. The sample space 103 communicates with an inlet (not shown) for receiving the fluid sample, and communicates with an outlet (not shown) for draining the fluid sample after use. An example of a fluid handling system for performing the required fluid handling tasks is given further below with reference to FIG. 3.

Relevant directions are indicated in the FIG. 1 and FIG. 2 by vectors "X", "Y", and "Z", wherein: X denotes a transverse direction of the sensor element parallel to the sensor surface; Z denotes a vertical direction perpendicular to the sensor surface; and Y denotes an axial direction of the sample space parallel to the sample surface and perpendicular to the transverse direction, along an axial direction of the sample space. In the configuration shown in FIG. 1 and FIG. 2 the transverse direction X points from an optical input towards an optical output; the axial direction Y points from a fluid inlet towards an outlet (not shown in the drawing) along a fluid channel forming the sample space; and the vertical direction Z points out of the sample space and away from the sensor surface.

The sensor element 101 has a translucent membrane 110 with a front side 111 defining a sensor surface for contacting the fluid sample, and a back side 112 facing away from the front side 112. The front side 111 of the translucent membrane 110 is coated with a reflective layer 114 of an inert metallic material, such as gold or platinum.

An optical input port 120 is connected to the back side 112 of the translucent membrane 110 for feeding probing light to the translucent membrane through the back side 112 of the translucent membrane 110. The probing light comes from a light source 121. The optical input port 120 may include an optical input fiber for guiding and directing the probing light from the light source 121 to the back side 112 of the translucent membrane 110. The optical input fiber may be attached to an input side of the sensor element 101 by any suitable mechanical mounting means. Advantageously, the input port mounting includes a transparent padding 122, such as optical grade glue for attaching the optical input fiber to the back side 112 of the translucent membrane 110. Preferably, such optical grade glue has a refractive index for the wavelength range of the probing light which matches the refractive index of the translucent membrane to within typical tolerances, such as within ±5%, or within ±2, or within ±1. Thereby, the probing light is efficiently coupled into the translucent membrane 110 in an input region 115 thereof.

An optical output port 130 is connected to the back side 112 of the translucent membrane 110 for collecting an optical response to the probing light from the translucent membrane 110 through the back side 112 of the translucent membrane 110. The collected optical response is detected by a detector 131. The detector 131 may be connected to the optical output port 130. The detector 131 is for detecting light emerging from the translucent membrane 110 in response to illumination by the light source 121. The detector 131 then generates a signal, such as an analog electrical and/or digital signal representative of the detected light. The optical output port 130 may include an optical output fiber for guiding and directing the optical response from the backside 112 of the translucent membrane 110 to the detector 131. The optical output fiber may be attached to an output side of the sensor element 101 by any suitable mechanical mounting means. Advantageously, the output port mounting includes a transparent padding 132, such as optical grade glue for attaching the optical output fiber to the back side 112 of the translucent membrane 110. Preferably, such optical grade glue has a refractive index for the wavelength range of the optical response light which matches the refractive index of the translucent membrane to within typical tolerances, such as within ±5%, or within ±2, or within ±1. Thereby, the optical response is efficiently collected from the translucent membrane 110 in an output region 117 thereof.

The sensor element further comprises an optical constriction element 140 arranged between the input port 120 and the output port 130. The constriction element 140 has a screen element 141 arranged between the input port 120 and the output port 130, thereby optically separating the output port 130 from the input port 120, blocking the direct passage of light from the input port 120 to the output port 130. The constriction element 140 further comprises a reflective element 142 arranged at the backside 112 of the translucent membrane 110 at a vertical distance D therefrom. The reflective element 142 faces towards the reflective layer. The reflective element 142 has a width Wr as seen in the transverse direction X. The reflective element 142 defines a probing region 116 in the translucent membrane 110, whereby light travelling from the input port 120 to the output port 130 is confined to pass through the probing region 116. The probing region has a width w as seen in the transverse direction X, which essentially corresponds to the reflective element width Wr. The probing region 116 has a height h as seen in the vertical direction Z corresponding to the distance D between the reflective layer 114 and the reflective element 142. The width w of the reflective element 141 of the optical constriction element 140 is less than the width of the sensor surface Ws. Generally, the width w and the height h of the probing region 116 are chosen such that light entering the probing region 116 from the input region 115 is forced to undergo at least a minimum number of multiple reflections before it can leave the probing region towards the output region 117 on the opposite side of the optical constriction element 140, as schematically indicated in FIG. 1 by a "zig-zag"-line in the probing region 116.

At least the probing region 116 comprises pores 118 extending from respective openings at the sensor surface into the translucent membrane 110. The pores are for separating a fraction with a representative analyte concentration from the fluid sample by diffusion, as for example disclosed in the co-pending international patent applications WO 2017/085162 A1 and WO 2017/085180 A1 by the applicant, which are hereby incorporated by reference. The pores in the probing region are then exposed to the probing radiation, which interacts with the probing radiation to produce an optical response indicative of the presence and/or concentration of a specific analyte in the fluid sample, e.g. an analyte specific absorption, which is detectable by a suitable detector 131. The pores may be present over the entire surface of the sensor element. However, due to the confinement of the probing radiation to the probing region 116 and the separation of the input side from the output side of the sensor element 101 by means of the optical constriction element 140, only pores within the probing region contribute to the detection signal. Thereby, the extend of the sensitive region of the sensor element can be precisely controlled and designed, for example in order to reproducibly probe only a representative portion of the fluid sample at the sensor surface to avoid any artifacts that may arise due to edge effects towards the side walls of the sample chamber.

Figure 3:
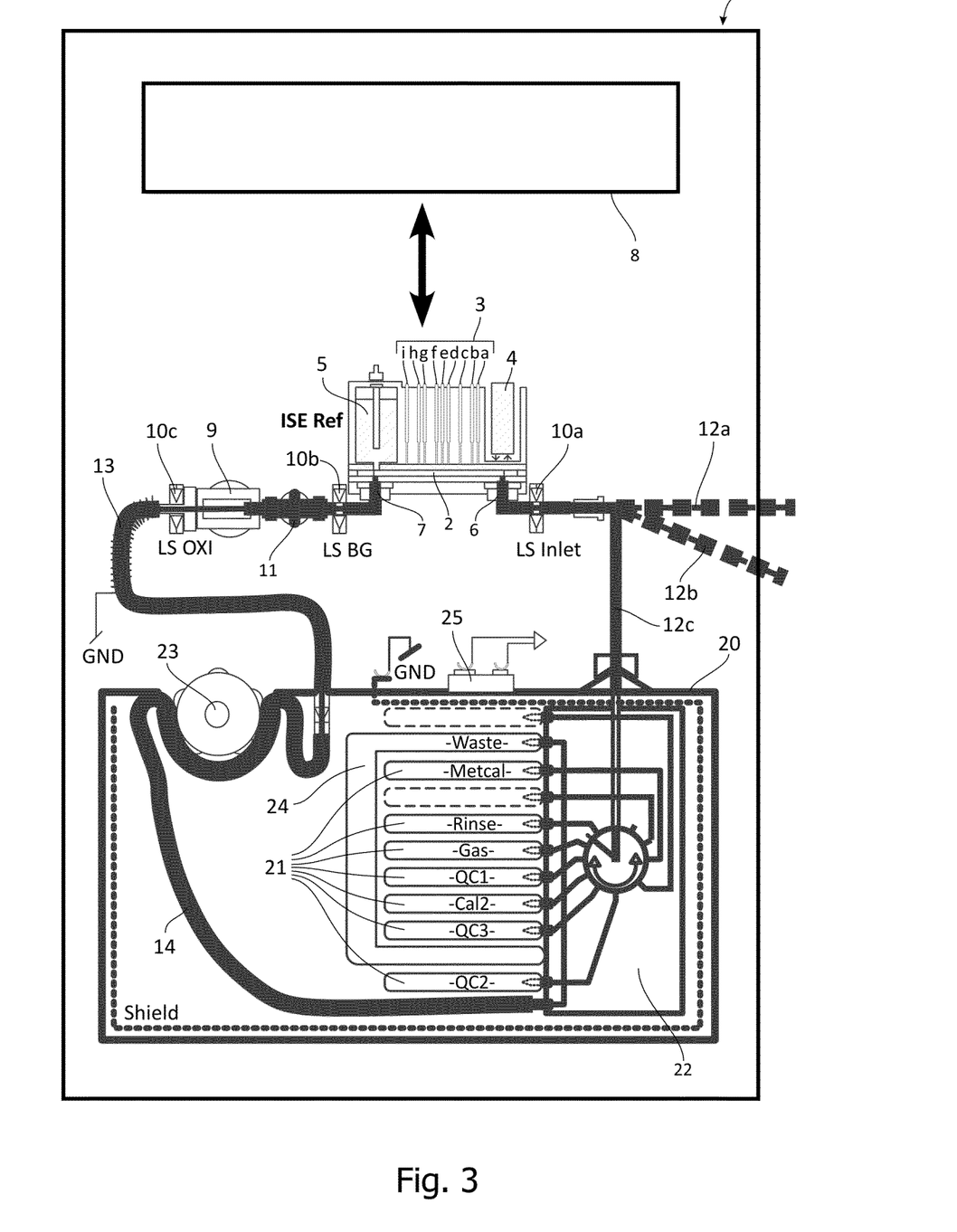

FIG. 3 shows schematically a liquid sample analyzer 1 with an analyzer part having a signal processor 8, one or more analyte sensors 3(*a-i*), 4, a measurement chamber 2, and fluid handling infrastructure 20. For performing measurements, the user may provide a liquid sample at an input port 12*a/b* of the analyzer 1. The liquid sample is transferred through an inlet port 6 to the measurement chamber 2 comprising a plurality of analyte sensors 3, 4. The analyte sensors 3, 4 are arranged to provide essentially simultaneous measurements on analyte parameters in a liquid sample, e.g. a whole blood sample. Preferably, the required sample amount for obtaining precise and reliable data is as small as possible. A detailed example of a sensor assembly design that is particularly suitable for simultaneously measuring a plurality of different parameters in bodily fluids, particularly in whole blood, and its use in a blood analyzer is e.g. found in EP 2 147 307 B1. Following pre-programmed instructions loaded in a signal processor 8 and/or user input, measurements are performed using the analyte sensors 3, 4. The analyte sensors 3, 4 generate signals that are representative of a physical parameter for the respective analyte and provide the signals to the signal processor 8 of the analyzer part. The signal processor 8 is adapted to receive and process signals from the analyte sensors 3, 4, and present the processed signals as output to a user or to a subsequent/further data analysis. After measurement, the liquid sample is discharged, and the measurement chamber 2 is prepared for the next measurement. The embodiment of the analyzer shown in FIG. 1 is particularly adapted for the measurement of blood parameters, and further comprises an optional oxygenation measurement device 9 downstream of the measurement chamber 2. Performing the measurements, calibration tasks, and quality control procedures thus typically involves the loading, unloading, rinsing, cleaning and re-loading of different liquids, which may be done by the fluid handling infrastructure 20. The fluid handling may be controlled in an automated way by the signal processor 8 according to pre-programmed instructions and/or user input. The fluid handling infrastructure 20 includes a number of reservoirs 21 pre-filled with process liquids (RINSE/CAL1, CAL2, QC1, QC2, QC3) for rinsing/wash-out, calibration and quality control tasks. The process liquids (RINSE/CAL1, CAL2, QC1, QC2, QC3) have a known compositions. The exact composition of a given batch may be stored in a chip 25 that may be attached to a cassette comprising the reservoirs 21, wherein the chip 25 may be read by the signal processor 8. The process liquid (RINSE/CAL1, CAL2, QC1, QC2, QC3) for a given process step may be selected by a fluid selector valve 22, and via feed line 12*c* transferred through the inlet port 6 to the measurement chamber 2. Correct filling of the measurement chamber 2 may be monitored and verified by visual inspection or according to known procedures by observing the propagation of a liquid interface through the system by means of liquid sensors 10*a*, 10*b*, 10*c* located upstream and downstream of the measurement chamber, such as at the inlet 6 ("LS inlet" 10*a*), at the outlet 7 ("LS BG" 10*b*), and just after the oxygenation measurement device 9 ("LS OXI" 10*c*), respectively. The fluid flow through the analyzer is driven by a pump 23, here a peristaltic hose-pump arranged downstream of the measurement chamber 2 and the oxygenation measurement device 9 and connected thereto via fluid line 13. The discharged fluids are finally transported through fluid line 14 to the waste reservoir 24.

Upon start-up and, in an ongoing manner, during uptime, the analyzer 1 performs self-control routines. If any abnormality is detected, the analyzer 1 indicates the deviation to a user, and may further indicate ways of overcoming an error state. On the other hand, when the analyzer indicates normal operation, measurements can be performed immediately. Advantageously according to some embodiments, the self-control routines may be performed during idle times, i.e. when the analyzer is in an idle state, where it is not used for performing actual measurements on a user's sample. The self-control routines may include continued repetitive measurements performed on a calibration-grade process liquid with a precisely known composition, as e.g. stored on chip 25. The signals obtained for each of the different analyte sensors 3, 4 on the well-known composition may then be used to continuously update the reference for the respective analyte measurements.

Either of the analyte sensors 3, 4 may be of the multiple reflection porous membrane type according to any of the embodiments as disclosed herein, e.g. according to the embodiment as described above with respect to FIG. 1 and FIG. 2. According to one embodiment, the sensor element for detecting an analyte in the liquid sample by optical probing is arranged as analyte sensor 4 at the upstream end of the measurement chamber 2, i.e. with the sensor surface next to and facing towards the inlet 6 of the measurement chamber 2.

The invention claimed is:

1. A sensor element for detecting an analyte in a fluid sample by optical probing, the sensor element comprising:
 (a) a translucent membrane with a front side defining a sensor surface for contacting the fluid sample, the front side facing the fluid sample, and a back side facing away from the front side;
 (b) at the front side of the translucent membrane, a reflective layer;
 (c) an optical input port adjacent to the back side of the translucent membrane for feeding probing light to the translucent membrane through the back side;
 (d) an optical output port adjacent to the back side of the translucent membrane for collecting an optical response from the translucent membrane through the back side; and
 (e) an optical constriction element, the optical constriction element comprising a screen element arranged between the input port and the output port, thereby optically separating the output port from the input port, the optical constriction element further comprising a reflective element arranged at the back side of the translucent membrane and facing towards the reflective layer at a vertical distance D therefrom, thereby defining a probing region as being between the reflective element and the reflective layer and within the translucent membrane, whereby light travelling from the input port to the output port is confined to pass through the probing region, wherein at least the probing region comprises pores extending from respective openings at the sensor surface into the translucent membrane.

2. The sensor element according to claim 1, further comprising a light source connected to the optical input port, wherein the light source is configured for emitting the probing light.

3. The sensor element according to claim 1, further comprising a detector connected to the optical output port, wherein the detector is configured for detecting light emerging from the probing region, and wherein the detector is adapted to generate a signal representative of the detected light.

4. The sensor element according to claim 1, wherein the reflective element has a width Wr as seen in a transverse direction parallel to the sensor surface that is less than a width of the sensor surface Ws as seen in the transverse direction, or less than half the width of the sensor surface Ws.

5. The sensor element according to claim 1, wherein the distance D of the reflective element from the reflective layer as seen in a vertical direction is less than 500 μm.

6. The sensor element according to claim 1, wherein a width Wr of the reflective element as seen in a transverse direction is less than 5 mm.

7. The sensor element according to claim 1, wherein an aspect ratio of the distance D of the reflective element from the reflective layer in a vertical direction with respect to a width Wr of the reflective element in a transverse direction parallel to the sensor surface is at least 1:2.

8. A sensor assembly comprising:
(a) a sensor element according to claim 1; and
(b) a sample chamber comprising a sample space for holding the fluid sample, the sample space being defined by chamber walls; wherein the sensor element is arranged in one of the chamber walls, wherein the sensor surface faces towards the sample space.

9. The sensor assembly according to claim 8, further comprising an inlet and an outlet defining a direction of flow from the inlet towards the outlet for fluid handling in the sample chamber, wherein the sensor element is oriented such that a transverse direction of the sensor element is perpendicular with respect to the direction of the flow.

10. The sensor assembly according to claim 9, wherein a reflective element width Wr is less than a width Wa of the sample space as seen in the transverse direction of the sensor element, or less than half of the sample space width Wa.

11. The sensor element according to claim 1, wherein the distance D of the reflective element from the reflective layer as seen in a vertical direction is less than 200 μm.

12. The sensor element according to claim 1, wherein the distance D of the reflective element from the reflective layer as seen in a vertical direction is less than 100 μm.

13. The sensor element according to claim 1, wherein the distance D of the reflective element from the reflective layer as seen in a vertical direction is about 50 μm.

14. The sensor element according to claim 1, wherein a width Wr of the reflective element as seen in a transverse direction is less than 2 mm.

15. The sensor element according to claim 1, wherein a width Wr of the reflective element as seen in a transverse direction is less than 1 mm.

16. The sensor element according to claim 1, wherein a width Wr of the reflective element as seen in a transverse direction is less than 0.5 mm.

17. The sensor according to claim 1, wherein an aspect ratio of the distance D of the reflective element from the reflective layer in a vertical direction with respect to a width Wr of the reflective element in a transverse direction parallel to the sensor surface is at least 1:2.

18. The sensor element according to claim 1, wherein an aspect ratio of the distance D of the reflective element from the reflective layer in a vertical direction with respect to a width Wr of the reflective element in a transverse direction parallel to the sensor surface is at least 1:5.

19. The sensor element according to claim 1, wherein an aspect ratio of the distance D of the reflective element from the reflective layer in a vertical direction with respect to a width Wr of the reflective element in a transverse direction parallel to the sensor surface is at least 1:20.

20. The sensor element according to claim 1, wherein an aspect ratio of the distance D of the reflective element from the reflective layer in a vertical direction with respect to a width Wr of the reflective element in a transverse direction parallel to the sensor surface is at least 1:50.

21. The sensor element according to claim 1, wherein the pores are filled with a priming fluid.

22. A sensor element for detecting an analyte in a fluid sample by optical probing, the sensor element comprising:
(a) a translucent membrane with a front side defining a sensor surface for contacting the fluid sample, and a back side facing away from the front side, wherein the translucent membrane defines a thickness;
(b) at the front side of the translucent membrane, a reflective layer;
(c) an optical input port connected to the back side of the translucent membrane for feeding probing light to the translucent membrane through the back side;
(d) an optical output port connected to the back side of the translucent membrane for collecting an optical response from the translucent membrane through the back side; and
(e) an optical constriction element, the optical constriction element comprising a screen element arranged between the input port and the output port, thereby optically separating the output port from the input port, the optical constriction element further comprising a reflective element arranged on the back side of the translucent membrane and facing towards the reflective layer at a vertical distance D therefrom, thereby defining a probing region as being between the reflective element and the reflective layer and within the translucent membrane, wherein the vertical distance D and the thickness are the same, whereby light travelling from the input port to the output port is confined to pass through the probing region, wherein at least the probing region comprises pores extending from respective openings at the sensor surface into the translucent membrane.

23. A sensor assembly for detecting an analyte in a fluid sample by optical probing, the sensor assembly comprising:
(a) a sample chamber comprising a sample space for holding the fluid sample; and
(b) a sample element comprising:
(i) a translucent membrane with a front side and a back side facing away from the front side, (ii) at the front side of the translucent membrane, a reflective layer, wherein the reflective layer is positioned between the translucent membrane and the sample chamber,
(iii) an optical input port connected to the back side of the translucent membrane for feeding probing light to the translucent membrane through the back side,
(iv) an optical output port connected to the back side of the translucent membrane for collecting an optical response from the translucent membrane through the back side, and
(v) an optical constriction element, the optical constriction element comprising a screen element arranged between the input port and the output port, thereby optically separating the output port from the input port, the optical constriction element further comprising a reflective element arranged at the back side of the translucent membrane and facing towards the reflective layer at a vertical distance D therefrom, thereby defining a probing region as being between the reflective element and the reflective layer and within the translucent membrane, whereby light travelling from the input port to the output port is confined to pass through the probing region, wherein at least the probing region comprises pores extending from respective openings at the sensor surface into the translucent membrane.

* * * * *